April 11, 1950 E. V. BERGSTROM 2,503,703
REACTOR
Filed April 27, 1946 3 Sheets-Sheet 1

INVENTOR
ERIC V. BERGSTROM
BY
Oswald G. Hayes
ATTORNEY

April 11, 1950     E. V. BERGSTROM     2,503,703

REACTOR

Filed April 27, 1946     3 Sheets-Sheet 2

Fig. 2,

INVENTOR
ERIC V. BERGSTROM
BY
Oswald G. Hayes
ATTORNEY

April 11, 1950   E. V. BERGSTROM   2,503,703
REACTOR
Filed April 27, 1946   3 Sheets-Sheet 3

INVENTOR
ERIC V. BERGSTROM
BY Oswald G. Hayes
ATTORNEY

Patented Apr. 11, 1950

2,503,703

UNITED STATES PATENT OFFICE 2,503,703

REACTOR

Eric V. Bergstrom, Short Hills, N. J., assignor to Socony-Vacuum Oil Company, Incorporated, a corporation of New York Application April 27, 1946, Serial No. 665,604

4 Claims. (Cl. 23—284)

This invention relates to apparatus for contacting a gas with a solid and is particularly concerned with a chamber for conducting a short time, high temperature reaction by introducing gaseous or vaporizable liquid reactants to a body of highly heated granular solids.

The invention is particularly adapted to high temperature cracking of hydrocarbons by contacting with highly heated granular solids followed by prompt quenching of the reaction mixture to inhibit further reaction or substantially reduce reaction velocity. A typical example of such reaction is the cracking of higher boiling hydrocarbons at temperatures on the order of 1500° F. and above to produce large yields of unsaturated compounds such as ethylene. Gas oil and reduced crude are readily cracked at 1500° F. to give yields in the neighborhood of 30% by weight of ethylene if the reaction time is held to a sufficiently short period to inhibit secondary reactions such as condensation to aromatic hydrocarbons. Similarly, propane and ethane give high yields of ethylene at reaction temperatures of 1700 F. or thereabouts but the reaction time must be kept very short in order to inhibit secondary reactions. When charge hydrocarbons are introduced into a bed of hot granular solids to be thereby heated to reaction temperature, the vaporous reaction mixture tends to flow along the shortest possible path to the disengaging surface at which it leaves contact with the hot solids. Since a short reaction time is desirable, the use of a bed of commercially practicable dimensions requires careful design to provide substantially equal paths through the solids for the several portions of the charge and thus maintain a uniform reaction time. According to the concept described in my copening application Serial No. 657,591, filed March 27, 1946, this desirable result can be achieved by supplying the hot granular solid onto a sloping divider in the reaction chamber. This results in a moving bed of hot granular solids having a sloping upper surface lying at the angle of repose of the solids employed. The charge is introduced at a plurality of points of constant distance from the upper surface of the bed and the path of contact between reactants and solid is thus maintained substantially constant for all portions of the charge.

The present invention constitutes an improvement over the invention described and claimed in the aforesaid application. In order to insure satisfactory operation it is desirable that a gas which does not itself undergo a reaction in the solid bed shall be introduced at a low point in the bed to purge reactant vapors from the bottom of the bed and cause such vapors to move upwardly and out of the bed by way of the top surface thereof. According to the present invention this result is achieved and flow of reactant material to the interior of a deflecting insert is inhibited by flowing a gas such as steam to the interior of the deflecting insert and providing means for distributing such gas through the body of the bed from the interior of the insert. It will be readily understood that reactive compositions such as hydrocarbons would be rapidly converted to a hard, dense, coky deposit if permitted to flow to the interior of the insert and there remain static at the elevated temperatures of the reaction.

Essentially, the invention contemplates a reaction chamber having a granular solid inlet at the top thereof and a sloping deflector insert directly below the inlet to cause the granular solids to flow as a moving bed having a sloping upper surface of predetermined nature depending upon the angle of repose of the solids. Distributing inlets are spaced in the bed below the sloping surface at a constant depth with relation to the upper surface of the bed to thereby provide a uniform path of gas-solid contact. The deflecting insert insures that all the contacting space shall be beside the sloping surface, that is, there shall be no contact directly below the granular solid inlet where the contact path would not be the same as in the other portions of the bed. The deflecting insert extends down through the whole depth of the bed and a gas such as steam is admitted to the interior of the insert, preferably under a pressure somewhat above that prevailing in the contacting zone. This purging gas is distributed through the lower portion of the bed from a low point in the deflector insert and thus purges hydrocarbon vapors from the body of solids and inhibits downward flow of the reactant gases from the distributor inlets.

Preferably, the depth of bed in the contactor below the reactant inlets shall be sufficiently greater than the depth of bed above the inlets that substantially all of the reactant vapors will tend to flow upward due to the greater pressure drop opposing downward flow. Steam appears to aid materially in the cracking of hydrocarbons to olefins although it does not seem that water vapor actually enters into the reaction. Other inert gases can be used as the purging medium but, since steam is fully effective for this purpose and is used in the actual reaction zone to promote the desired reaction, steam is preferred as the purging gas.

The annexed drawings show apparatus for the cracking of hydrocarbons to ethylene including the contacting device of this invention.

Figure 1:
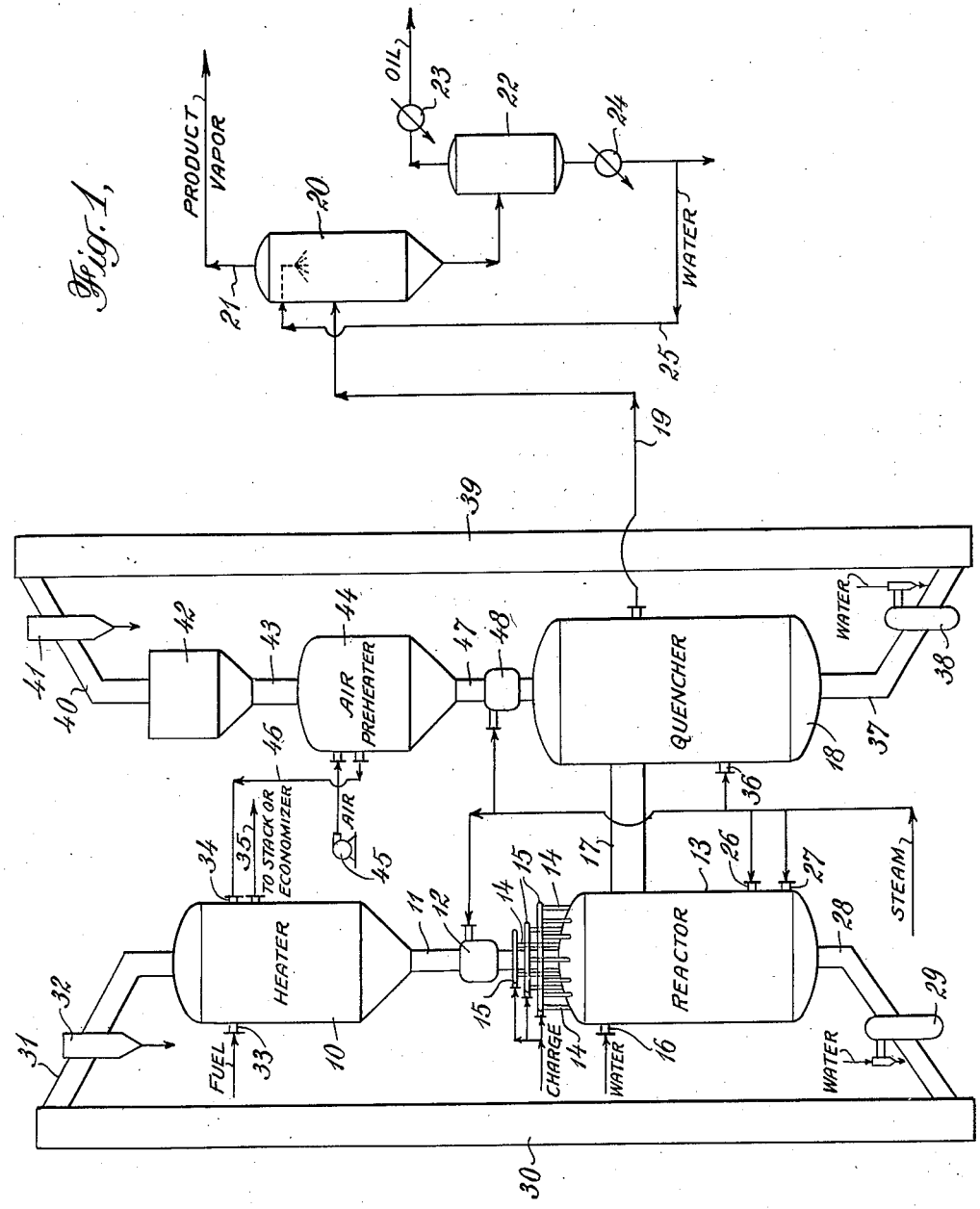
Figure 1 is a diagrammatic showing of the relationship of the several elements making up a plant for this purpose.

Referring specifically now to Figure 1, a hot granular solid is heated to a suitable high temperature in heater 10 and transferred by feed leg 11 through a steam sealing zone 12 to a reactor 13. A charge for the reaction is introduced by a plurality of inlet tubes 14 depending from ring manifolds 15 at the top of the reactor. The number and spacing of tubes 14 is such as to give uniform spacing of the discharge openings at the bottom ends thereof, depending on the size and shape of the cross-section of reactor 13. A typical structure has an internal diameter of the reactor shell (50 in Figure 2) of six feet, nine inches with a deflecting insert having an outside diameter of two feet. Three concentric rings of tubes 14 contain 11, 18 and 23 tubes, respectively. The charge may advantageously be a liquid oil, mixed with liquid water, to generate the hydrocarbon and steam vapors desired for the reaction. Alternatively, hydrocarbon and steam vapors may be generated outside the reactor and charged thereto as a vapor phase mixture. Preheating of liquid charge to any desired degree will depend upon the heat balance factors involved, such as the desired temperature for granular solids withdrawn from the bottom of reactor 13.

Within the reactor 13 the charge is passed in direct contact with the highly heated granular solids and is thus rapidly converted to a vapor phase mixture having the temperature desired for the reaction. Upon leaving the contact bed, the reaction mixture is quenched by the injection of water supplied from inlet 16 and is passed by conduit 17 to a quencher 18 wherein it is passed through a moving bed of relatively cool granular solids for further reduction of temperature. The quenched reaction mixture is transferred by line 19 to a spray condenser 20 from which product vapors are taken overhead by line 21 to a suitable gas plant for purification and recovery of the gaseous products of the reaction. Oil and water from the bottom of condenser 20 are passed to a settler 22 wherein they separate into an upper oil layer which is cooled in heat exchanger 23 before transfer to processing or storage and a lower water layer which is cooled in heat exchanger 24 to be recycled in part to the spray condenser by line 25. If the charge to the reactor is in liquid phase, water from the bottom of settler 22 may be used in the charge since contamination of the charge water has no detrimental effect in such operations, the contaminants being either vaporized with the water or deposited on the granular solid from which they may be removed by burning in the heater.

Returning now to the reactor 13, a purge gas such as steam is admitted to the bottom of the reactor at inlet 26 and a pressuring medium, which may also be steam is admitted at inlet 27 to be used in a manner to be hereinafter described for preventing deposition of carbonaceous substances in the reactor insulation. The granular solids are withdrawn from the bottom of reactor 13 by pipe 28 and are passed through a depressuring pot 29 to an elevator 30. In general, solids transferred to the elevator should be maintained at a temperature which will not damage the elevator or adversely affect its operation. If the outlet temperature of reactor 13 is too high, water may be injected to the solids in depressuring pot 29 or water may be sprayed onto the solids entering the housing of elevator 30, in which case the elevator shaft acts as a stack for the withdrawal of steam so generated. Solids are discharged from the top of elevator 30 into a feed pipe 31, passed through a classifier 32 for removal of particles broken down to a size smaller than that desired and are then fed to heater 10 to again pass through the cycle. In the heater fuel from inlet 33 is burned in pre-heated air supplied at 34 to generate a flame in direct contact with the solid granules and thus heat the latter to the desired degree. Flue gases are withdrawn at 35 and passed to an economizer or stack.

The quencher is an element of a similar cycle of granular solids and wherein the granules serve to cool vaporous reaction mixture from reactor 13 and are then purged by steam admitted at 36 and passed by pipe 37 and depressuring pot 38 to an elevator 39. From the top of elevator 39 the solids are discharged by pipe 40 through a classifier 41 to a hopper 42. Solids are supplied through feed leg 43 to an air preheater 44 wherein they are contacted with air from blower 45 to preheat the same. The preheated air is then transferred by line 46 to inlet 34 of heater 10. Any carbonaceous deposit in the nature of coke or tar laid down on the solids in the quencher 18 will be burned off in heater 44 but a large excess of air is supplied to chamber 44 and the net effect is to cool the solids in chamber 44 whereupon the cold granules are transferred by feed leg 47 through a steam purging zone 48 to the quencher 18.

Figure 2:
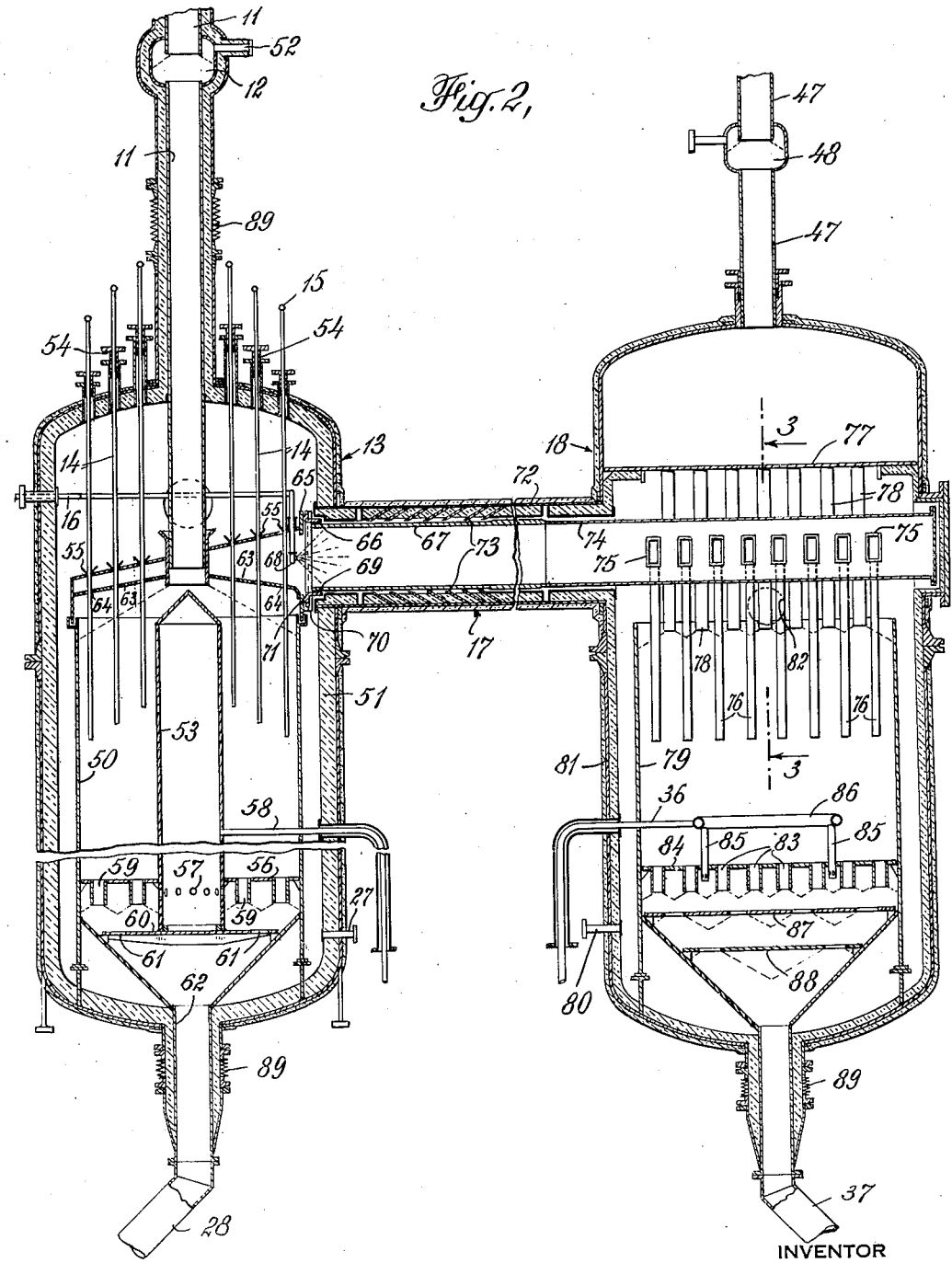
Figure 2 is a vertical section through a contactor and quencher and the communicating conduit therebetween.
Figure 3:
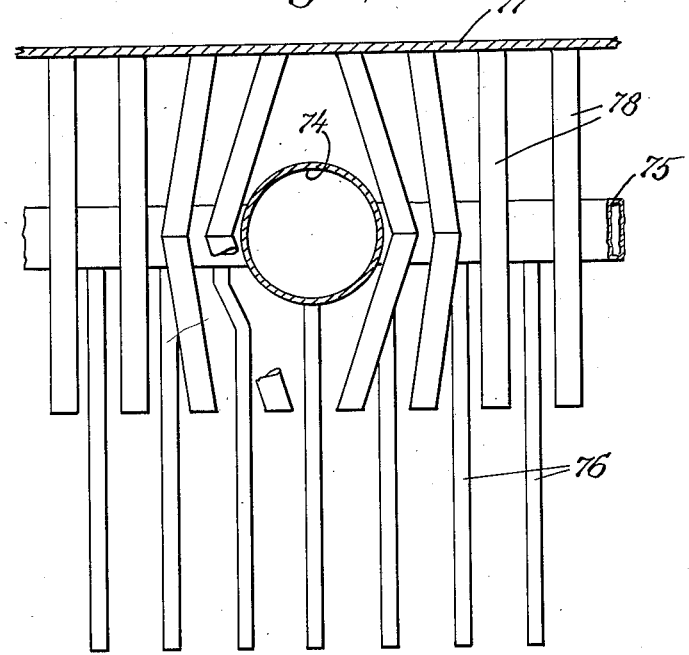
Figure 3 is a section on line 3—3 of Figure 2.
Figure 4:
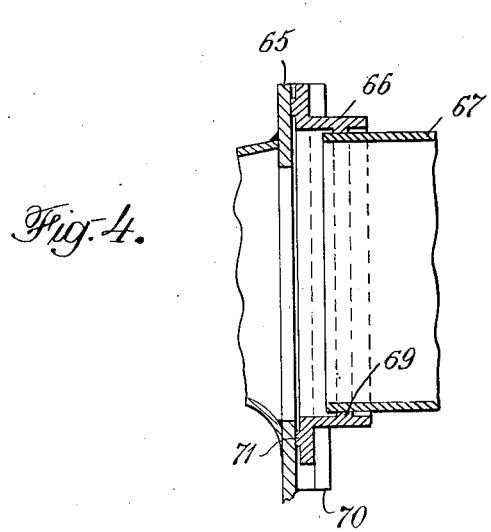
Figure 4 is a detail view in section of the reactor outlet part.

As shown in Figure 2, the reactor 13 comprises a reaction shell 50 within an insulated casing 51. Granular solids from feed leg 11 fall into the steam sealing element 12 and form therein a small heap of granular solids. Steam is admitted above the heap of solids from pipe 52 under a pressure greater than that existing in either the heater or the reactor to thus prevent any mixing of vapors from the elements connected by feed leg 11. From the steam sealing chamber 12 the solids move downwardly through the bottom portion of feed leg 11 into the reactor 13 wherein they fall onto a sloping divider insert 53 and are thereby diverted to the contacting region of the reactor, none of which lies directly below the outlet of feed leg 11. Within the shell 50 the granular solids take the form of a moving bed of granular solids having an upper surface which lies at about the angle of repose about the solids. It may be noted that the flow of gases upwardly through the bed has an effect on the angle of repose of the solids depending upon the gas velocity. As the gas velocity approaches that at which the granular solids would be suspended in the stream of gases, the angle of repose approaches the horizontal. This is an important element in determining how the charge inlets shall be disposed within the bed as will appear hereinafter.

The charge is admitted by the pipes 14 which extend downwardly through the insulated casing 51 and the top of shell 50 to points within the bed of granular solid. The pipes 14 are mounted for vertical movement through stuffing boxes 54 and sealing flanges 55 in the top of shell 50. To obtain uniformity of contact path within the bed of granular solids the several pipes 14 are adjusted to have their lower ends at a constant depth below the upper surface of the bed in shell 50. In the embodiment here shown, the reactor 13 is circular in general outline wherefor the upper surface of dividing insert 53, the upper surface of the moving contact bed and the surface along which the outlets of pipe 14 are arranged are generally conical. It will be readily understood that other outlines may be adopted for reactor 13 in which case these surfaces will be of a different nature.

The bed in reactor 13 is considerably deeper than that necessary to accommodate the contacting zone above the discharge of pipes 14. Some of the heavier hydrocarbons may remain on the granular solid for a substantial distance below the pipes 14 before they become fully vaporized. Any vapors, whether formed instantaneously or substantially below the pipes 14 are caused to pass upwardly through the bed and are brought to maximum temperature in the region above the ends of pipes 14 where the solid has not yet been chilled by direct contact with charge hydrocarbons. A deep bed offers fairly high resistance to the passage of hydrocarbons downwardly, thus encouraging flow of gases through the path of least resistance to the top of the bed. Additionally, provision is made for an inert gas such as steam to sweep upwardly through the bed. This latter result is achieved by injecting steam or the like below a plate 56 through orifices 57 in the wall of the divider insert 53. Steam under pressure somewhat in excess of that prevailing in the contacting zone is admitted to the interior of divider insert 53 by means of pipe 58. The steam pressure inside insert 53 effectively prevents leakage of hydrocarbons to this space thus inhibiting deposition of coky matter from extensive cracking of hydrocarbons inside the insert. A number of feed pipes 59 depend from plate 56 for the withdrawal of granular solids in a uniform manner across the interior of shell 50. Each one of the pipes 59 withdraws solid from a space diverging upwardly therefrom and the greater the number of these pipes, the less will be the volume of dead spaces wherein the granular solids are not flowing. A plate 60 has orifices 61 spaced so that each of the orifices 61 draws equally from two or more pipes 59 thus equalizing the flow among the pipes 59. The symmetrical arrangement of orifices 61 about the center of shell 50 results in uniform withdrawal from these orifices by outlet pipe 62. As the granular solid flows from the ends of pipes 59 onto plate 60 it assumes the form of a large number of heaps below the free space about the pipes 59. The steam discharged through orifices 57 fills this space and penetrates the heaps to flow upwardly through the pipes 59 thus purging the granular solid as it is withdrawn and producing upward flow of a current of inert gas through the moving bed between plate 56 and the top contacting zone thus insuring that all volatile hydrocarbons shall pass through the high temperature zone at the top of the bed and undergo the desired cracking. This also minimizes the danger of combustible materials being carried from the reactor into the elevator to thus cause a fire hazard.

The space between the insulated casing 51 and the shell 50 is also placed under an inert gas pressure slightly in excess of the pressure in the contacting zone by admitting steam or the like through inlet 27. The pressure of the steam will be such that steam will flow slowly into the casing 50 from the space thereabout through any opening which might permit leakage. The chance that hydrocarbons will seep out into the insulation or to the space about shell 50 is thus effectively overcome.

A manifold for withdraw of reactant vapors is provided above the bed of contact material by the top wall of shell 50 and a plate 63 having orifices 64 through which the pipes 14 are passed. The orifices 64 act to throttle disengaged vapors rising from the contact bed and thus afford equal flow into the manifold from the various areas above the bed. For example, the orifices 64 may be of such area as to provide a uniform linear velocity of 100 ft. per second through the orifices and the manifold. The manifold is connected to the conduit 17 by a sliding joint comprising a flange 65 at the outlet of the manifold and a collar 66 on an insulated pipe 67 which defines the transfer line between reactor 13 and quencher 18. The water for preliminary quenching may be advantageously admitted at this point, as by means of a spray 68 facing in the direction of vapor flow.

The transfer line between the reactor and the quenches is subject to high thermal stresses and is therefore advantageously mounted and connected in the manner shown. The collar 66 is slidably mounted on the reactor end of pipe 67 and contacts the latter along a relatively small surface such as integral ring 69. A pair of guides 70 mounted on the flange 65 maintain the face of collar 66 in contact with flange 65 along the relatively small area of the raised ring 71. The guides 70 are preferably so formed that they permit some play of the collar 69 from side to side but maintain a fairly firm contact between ring 71 and flange 65. There is thus provided a connection between the manifold and the pipe 67 which permits relative movement of pipe 67 with respect to flange 65 over a considerable distance in any direction without substantial effect upon the nature of the connection. No attempt is made to provide a vapor-tight connection at this point since the steam pressure imposed between shell 50 and casing 51 will prevent the loss of reactant vapors at this point.

In the insulated space between the pipe 67 and a metal wall 72 are disposed a plurality of webs 73 disposed at an angle to the pipe 67 to maintain the spacing between the pipe and the metal wall. The inner ends of these webs are adapted to fit fairly closely to the outer surface of pipe 67 but are not secured thereto, whereby the pipe 67 may slide through the webs under the influence of thermal expansion. The webs are placed at an acute angle to the pipe 67 in order to substantially reduce the temperature differential per unit of length and thus cut down the heat loss by conduction along the webs 73. It will be noted that a similar type of connection is made at 74 on the reactor feed leg. The webs 73 serve another function in reducing the flow of inert pressuring gas from the space about shell 50 into the quencher 18. The pressure drop through the gap between the end of a web 73 and the pipe 69 is substantial and very little pressuring gas will flow between the pipe 67 and its insulation due to the several high pressure drop gaps thus imposed in its path.

At its end remote from reactor 13, pipe 67 is connected to a manifold 74 for distributing gas in the quencher 18. A plurality of headers 75 extend from each side of the manifold 74 and a plurality of drop pipes 76 depend from each of the headers 75 into a body of relatively cold granular solid in the quencher. Granular solid from the air preheater enters the quencher through feed leg 47 and falls onto a plate 77 from which depend a plurality of feed pipes 78, supplying cold granular solid to the contacting zone below manifold 74. As shown, the contacting zone is enclosed by a shell 79 and an inert pressuring gas such as steam may be admitted by pipe 80 to the space between shell 79 and an insulated casing 81. Quenched reaction products are withdrawn from quencher 18 by an outlet 82 open to the disengaging space among the drop pipes 76 and feed pipes 78.

Uniform flow of solids across the contacting bed in quencher 13 is induced by a number of flow control pipes 83 depending from a plate 84. Purging steam is introduced to the space under plate 84 by pipes 85 communicating with a ring manifold 86 supplied from steam inlet 36. Flow control plates 87 and 88 function to induce equivalent flow through each of the pipes 83 and thus cause the latter to draw equally from all parts of the contacting bed.

As shown, conventional bellows type expansion joints 89 are provided on the granular solid transfer pipes and other places where the same are found desirable.

The thermal strains involved in apparatus of this type are well illustrated by application of this apparatus to the cracking of gas oil to produce ethylene. Circulating granular fused alumina having an average particle diameter of 0.3 inch in both the reaction and quenching cycles, 28.1% by weight of ethylene is produced at a mean effective temperature of 1440° F. and a contact time of 0.29 second. The granular solid is heated to 1575° F. in the heater and enters the reactor at 1546° F. A mixture of 33% steam and 67% gas oil (by weight) is admitted to the reactor at 625° F. with a space velocity of 3.12 volumes of liquid oil at 60° F. per volume of reaction space per hour. A granular solid to oil weight ratio of 11.95 is maintained, using a zone of contact 24 inches deep. The heated reaction mixture is disengaged from the solid bed at 1545° F. and quenched with water to 1200° F., at which temperature it is transferred to the quencher and further cooled therein to 572° F. The quenched reaction mixture is further cooled in the spray condenser to 100° F. and is then treated for recovery of the products of the reaction. Among the liquid by-products are 5.5% of depentanized motor gasoline having an end point of 416° F. and an octane number of 94.6 with 3 cc. of tetraethyl lead per gallon.

I claim:

1. A contactor comprising a vertical shell, an inlet at the top of said shell to supply granular solid material thereto, outlet means to withdraw solid granular material from the bottom of said shell, a hollow deflecting insert in said shell below said inlet arranged to deflect solids moving downwardly through said shell from portions directly below said inlet, said insert extending downward in said shell to a point adjacent said outlet means, means to distribute a fluid across said shell intermediate said inlet and said outlet means, means to withdraw fluid from the upper part of said shell, means to introduce a pressuring gas to the interior of said hollow insert and means to distribute said pressuring gas from said insert across the lower portion of said shell.

2. A contactor comprising a vertical shell, an inlet at the top of said shell to supply granular solid material thereto, a hollow deflecting insert in said shell below said inlet arranged to deflect solids moving downwardly through said shell from portions thereof directly below said inlet, said insert having a sloping top and vertical sides extending downwardly toward the bottom of said shell, a plate extending across the space between said insert and said shell above the bottom of said insert, a plurality of pipes opening through and depending from said plate, means to permit flow of gas from the interior of said insert to the space about said pipes below said plate, means to supply a gas to the interior of said hollow insert, means to distribute a fluid across the said space between said insert and said shell above said plate and means to withdraw vapor from the upper portion of said shell.

3. A contactor comprising a vertical shell, an inlet at the top of said shell to supply granular solid material thereto, a hollow deflecting insert in said shell below said inlet arranged to deflect solids moving downwardly through said shell from portions thereof directly below said inlet, said insert comprising a vertical cylinder with a conical top, said cylinder extending downwardly toward the bottom of said shell, a plate extending across the space between said insert and said shell above the bottom of said insert, a plurality of pipes opening through and depending from said plate, orifice means to permit flow of gas from the interior of said insert to the space about said pipes below said plate, conduit means to supply a gas to the interior of said hollow insert, a plurality of spaced tubes extending downwardly into said shell with the tube exits equally distributed over the cross-sectional area between said insert and said shell in a generally conical arrangement, said tube exits being vertically located to provide a depth of bed below said exits substantially greater than the depth of bed above said exits, and means to withdraw vapor from the upper portion of said shell.

4. A reactor comprising an interior vertical shell, an exterior insulating vertical shell surrounding said interior shell and spaced therefrom, said exterior shell extending upwardly to provide considerable space above the top of said interior shell, a first partition wall horizontally mounted within said interior shell located near the top thereof to define a collecting chamber, said first partition wall possessing a plurality of orifice openings to permit the passage of fluids upwardly to said collection chamber, a conduit attached to the upper portion of said interior shell adapted to conduct said fluids from said collection chamber outside of said exterior shell, an inlet conduit vertically mounted to downwardly project through the top of said exterior shell to a point within said interior shell below said first partition wall, a concentric hollow shell with an apical top located within said interior shell to spread the flow from said inlet conduit, a conduit through said outer, inner, and concentric shells to permit the passage of inert gas to the interior of said concentric shell, a second partition wall horizontally located in said inner shell between said concentric shell and said inner shell wall, openings through said second partition wall with short conduits depending therebelow to permit flow therethrough, orifices located in the vertical wall of said concentric shell below said second partition wall to permit the passage of inert gas to the space surrounding said short depending conduits, a third partition wall horizontally mounted in the lower portion of said inner shell, orifice openings through said third partition wall to permit transfer therethrough, feed conduits projecting through the roof of said inner shell to points of egress located between said first partition wall and said second partition wall, equally distributed across the cross-sectional area of said inner shell, said points of egress having a generally conical arrangement, an outlet passageway located at the bottom of said inner shell and downwardly projected through the bottom of said outer shell.

ERIC V. BERGSTROM.

No references cited.